United States Patent
Yang et al.

(10) Patent No.: US 10,657,720 B2
(45) Date of Patent: May 19, 2020

(54) VIRTUAL REALITY SYSTEM HAVING ADAPTIVE CONTROLLING FUNCTION AND CONTROLLING METHOD THEREOF

(71) Applicant: Acer Incorporated, New Taipei (TW)

(72) Inventors: Chao-Kuang Yang, New Taipei (TW); Hung-Chih Yu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 15 days.

(21) Appl. No.: 15/863,315

(22) Filed: Jan. 5, 2018

(65) Prior Publication Data

US 2018/0336731 A1   Nov. 22, 2018

(30) Foreign Application Priority Data

May 17, 2017   (TW) .............................. 106116253 A

(51) Int. Cl.
| | |
|---|---|
| *G06T 19/00* | (2011.01) |
| *G06F 3/01* | (2006.01) |
| *G06F 3/0346* | (2013.01) |
| *G02B 27/01* | (2006.01) |
| *G06T 9/00* | (2006.01) |
| *H04L 29/08* | (2006.01) |

(52) U.S. Cl.
CPC .......... *G06T 19/006* (2013.01); *G02B 27/017* (2013.01); *G06F 3/011* (2013.01); *G06F 3/012* (2013.01); *G06F 3/0346* (2013.01); *G02B 2027/014* (2013.01); *G02B 2027/0187* (2013.01); *G06T 9/00* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,538,160 B1 * | 1/2017 | Cole ................... | H04N 13/243 |
| 2013/0222215 A1 * | 8/2013 | Kobayashi .............. | G06F 3/011 |
| | | | 345/8 |
| 2014/0375680 A1 * | 12/2014 | Ackerman ........... | G06T 19/006 |
| | | | 345/633 |
| 2016/0026253 A1 * | 1/2016 | Bradski ................ | G02B 27/225 |
| | | | 345/8 |
| 2016/0150212 A1 * | 5/2016 | Moura ................. | H04N 19/597 |
| | | | 375/240.02 |
| 2016/0239080 A1 * | 8/2016 | Marcolina ............... | G06F 3/011 |
| 2016/0274660 A1 * | 9/2016 | Publicover ............. | G06F 21/64 |

FOREIGN PATENT DOCUMENTS

CN       105377383 A       3/2016

* cited by examiner

*Primary Examiner* — Yingchun He
(74) *Attorney, Agent, or Firm* — Birch, Stewart, Kolasch & Birch, LLP

(57) ABSTRACT

A virtual reality system having adaptive controlling function and a controlling method thereof. The controlling method of a virtual reality system includes the following steps: A sensing signal is obtained by a head-mounted display device. A procedure of transmitting a virtual reality content to the head-mounted display device is adaptively controlled by a host according to the sensing signal.

10 Claims, 4 Drawing Sheets

VIRTUAL REALITY SYSTEM HAVING ADAPTIVE CONTROLLING FUNCTION AND CONTROLLING METHOD THEREOF

This application claims the benefit of Taiwan application Serial No. 106116253, filed May 17, 2017, the disclosure of which is incorporated by reference herein in its entirety.

TECHNICAL FIELD

The disclosure relates in general to a virtual reality system and a controlling method thereof, and more particularly to a virtual reality system having adaptive controlling function and a controlling method thereof.

BACKGROUND

Along with the development of the virtual reality (VR) technology, various software and hardware products of virtual reality are provided one after another. The virtual reality technology generates a 3D virtual world through computer simulation, which simulates user's visual faculty and provides a sense of immediacy to the user.

In the application of the virtual reality, a large volume of data may need to be transmitted instantly or processed with complicated computation. If the data volume is too large or the computation is too complicated, latency may occur and the requirement of immediacy may not be achieved.

Or, in the application of the virtual reality, the virtual reality content may not match the user's instant needs. That is, the application of the virtual reality is not user friendly.

SUMMARY

The disclosure is directed to a virtual reality system and a controlling method thereof for performing adaptive control using a sensing signal, such that latency can be effectively reduced, the immediacy requirement of operation can be achieved, and the application of the virtual reality can be more user friendly.

According to one embodiment, a controlling method of a virtual reality system is provided. The controlling method of the virtual reality system includes the following steps: A sensing signal is obtained by a head-mounted display device. A procedure of transmitting a virtual reality content to the head-mounted display device is adaptively controlled by a host according to the sensing signal.

According to another embodiment, a virtual reality system is provided. The virtual reality system includes a head-mounted display device and a host. The head-mounted display device obtains a sensing signal. The host adaptively controls a procedure of transmitting a virtual reality content to the head-mounted display device according to the sensing signal.

According to another embodiment, a host is provided. The host includes a transmitting unit and a processing unit. The transmitting unit receives a sensing signal from a head-mounted display device. The processing unit adaptively controls a procedure of transmitting a virtual reality content to the head-mounted display device according to the sensing signal.

According to another embodiment, a head-mounted display device is provided. The head-mounted display device includes a sensing unit and a transmitting unit. The sensing unit obtains a sensing signal. The transmitting unit transmits the sensing signal to a host, such that the host according to the sensing signal, adaptively controls a procedure of transmitting a virtual reality content to the head-mounted display device.

According to another embodiment, a virtual reality system is provided. The virtual reality system includes a head-mounted display device, a host and a portable device. The head-mounted display device obtains a sensing signal. The portable device adaptively controls a procedure of transmitting a virtual reality content to the head-mounted display device via the host according to the sensing signal.

According to another embodiment, a portable device is provided. The portable device includes a transmitting unit and a processing unit. The transmitting unit receives a sensing signal from a head-mounted display device. The processing unit adaptively controls a procedure of transmitting a virtual reality content to the head-mounted display device via a host according to the sensing signal.

The above and other aspects of the invention will become better understood with regard to the following detailed description of the preferred but non-limiting embodiment(s). The following description is made with reference to the accompanying drawings.

DETAILED DESCRIPTION

Figure 1:
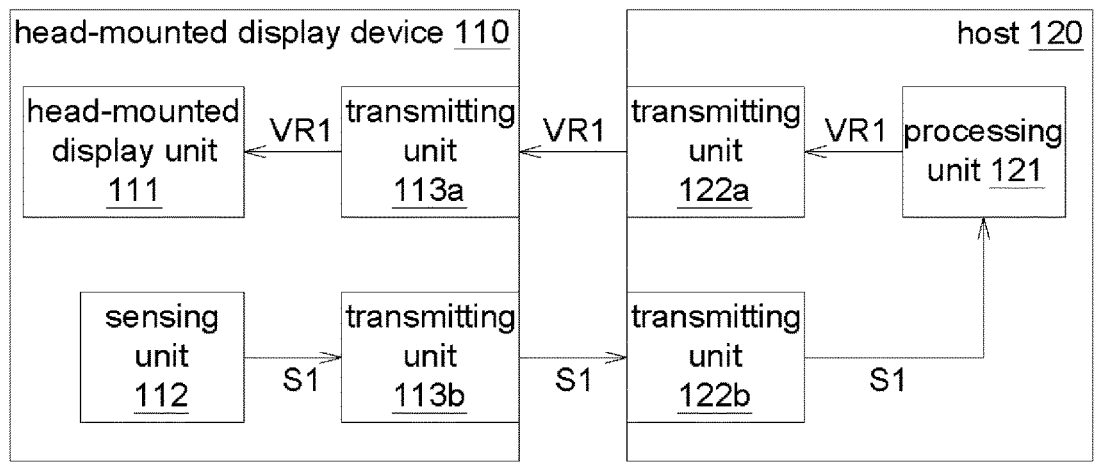
FIG. 1 is a block diagram of a virtual reality system according to an embodiment of the invention.

Referring to FIG. 1, a virtual reality system 100 according to an embodiment of the invention is shown. As indicated in FIG. 1, the virtual reality system 100 includes a head-mounted display device 110 and a host 120.

The head-mounted display device 110 can be realized by an eye mask or a helmet. The host 120 can be realized by a desktop computer, a server, a notebook computer, a smart phone, a cloud computation center, a chip or a circuit board.

The head-mounted display device 110 includes a head-mounted display unit 111, a sensing unit 112, a transmitting unit 113a and a transmitting unit 113b. The host 120 includes a processing unit 121, a transmitting unit 122a and a transmitting unit 122b.

The head-mounted display unit 111 displays various contents. The sensing unit 112 tracks the location and the direction of the head-mounted display device 110 or detects the user's physiological state. The sensing unit 112 can be realized by an outside-in tracking unit or an inside-out tracking unit. Or, the sensing unit 112 can be realized by a pupil camera, a pulse measuring device, a blood pressure measuring device, or a body temperature sensor.

The transmitting units 113a, 113b, 122a, and 122b perform the signal transmission. The transmitting units 113a, 113b, 122a, and 122b can be realized by a wireless transmission module or a wired transmission module. The processing unit 121 performs various image processing procedures. The processing unit 121 can be realized by a chip, a circuit board, a circuit or a storage device storing several programming codes.

In the present embodiment, the host 120 adaptively controls a procedure of transmitting a virtual reality content VR1 to the head-mounted display device 110 according to a sensing signal S1 of the head-mounted display device 110.

Figure 2:
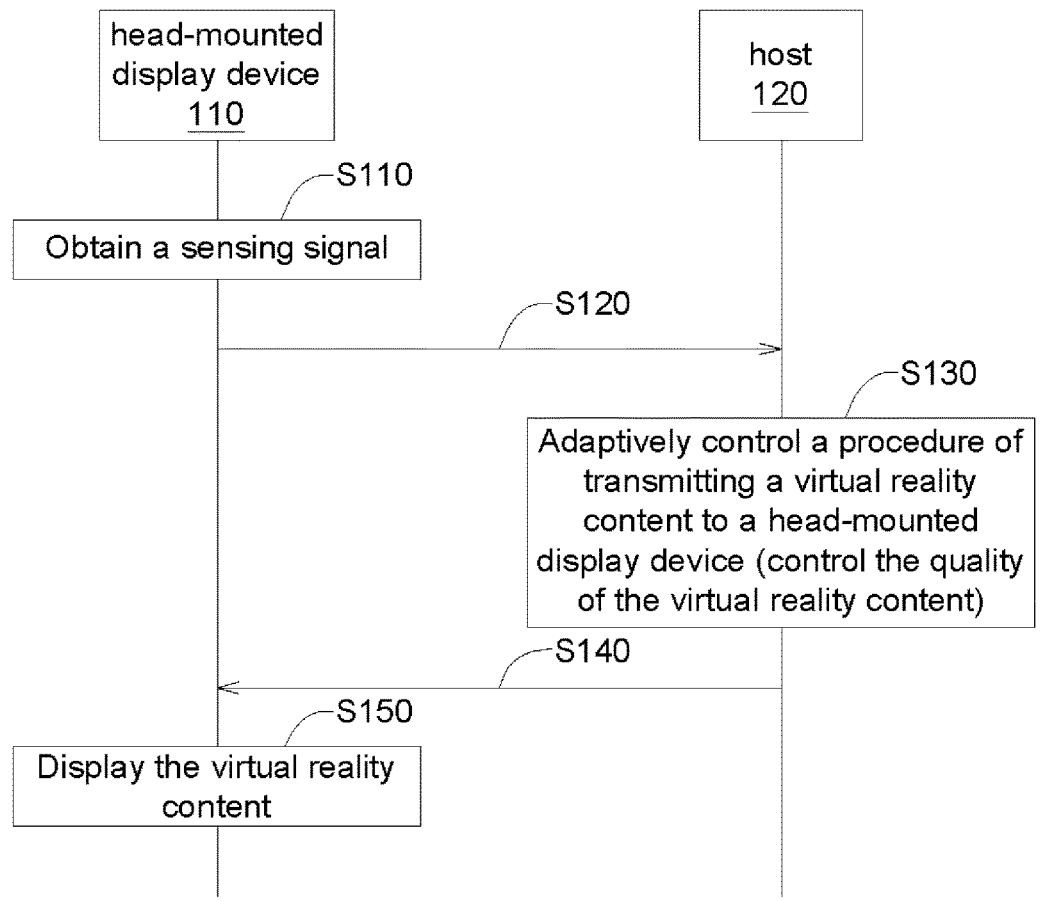
FIG. 2 is a flowchart of a controlling method of a virtual reality system according to an embodiment of the invention.

The operations of the above elements are described below with accompanying drawings. Referring to FIG. 2, a flowchart of a controlling method of the virtual reality system 100 according to an embodiment of the invention is shown.

Firstly, the method begins at step S110, a sensing signal S1 is obtained by the sensing unit 112 of the head-mounted display device 110. The sensing signal S1 can be realized by a rotating signal, a movement signal, or a vibration signal of the head-mounted display device 110. In an embodiment, the sensing signal S1 can be realized by a physiological signal of a user.

Then, the method proceeds to step S120, the sensing signal S1 is transmitted to the host 120 by the transmitting unit 113b of the head-mounted display device 110.

Then, the method proceeds to step S130, a procedure of transmitting a virtual reality content VR1 to the head-mounted display device 110 is adaptively controlled by the processing unit 121 of the host 120 according to the sensing signal S1. In this step, the processing unit 121 controls the quality of the virtual reality content VR1 (such as a compression ratio, a resolution, a vector complexity (including two-dimensional vector or three-dimensional vector), a frame rate, a brightness or a saturation).

Then, the method proceeds to step S140, the procedure of transmitting the virtual reality content VR1 to the head-mounted display device 110 is performed by the host 120.

Then, the method proceeds to step S150, the virtual reality content VR1 is displayed by the head-mounted display unit 111 of the head-mounted display device 110.

Figure 3:
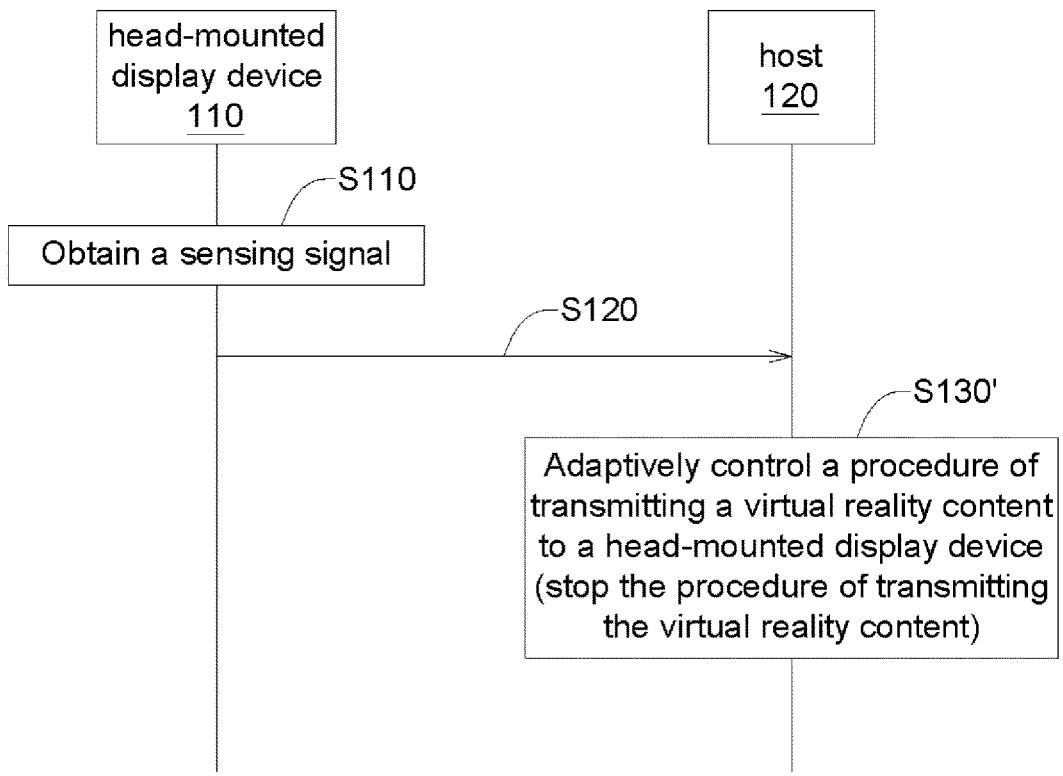
FIG. 3 is a flowchart of a controlling method of a virtual reality system according to another embodiment of the invention.

Referring to FIG. 3, a flowchart of a controlling method of the virtual reality system 100 according to another embodiment of the invention is shown. In step S130' of another embodiment, the procedure of transmitting the virtual reality content VR1 is stopped by the processing unit 121, and subsequent steps S140 and S150 are not performed.

The states denoted by the sensing signal S1 and corresponding control actions thereof are illustrated in Table 1. However, the illustrated examples are for exemplary and explanatory purposes only, not for limiting the scope of the invention. As indicated in examples 1 to 4, the procedure of transmitting the virtual reality content VR1 can be adaptively controlled (by increasing the frame rate, reducing the resolution (to reduce the data transfer rate), reducing the vector complexity, or stopping the transmission of the virtual reality content) according to the user's action state. Thus, latency can be effectively reduced and immediacy requirement of operation can be satisfied.

As indicated in examples 5 to 9, the procedure of transmitting the virtual reality content VR1 can be adaptively controlled (by stopping the transmission of the virtual reality content, reducing the frame shaking, reducing the play speed or changing to transmit the soft music) according to the physiological state of the user to match the user's physiological needs.

TABLE 1

| Examples | States denoted by the sensing signal S1 | Control actions |
|---|---|---|
| 1 | The user moves fast | Increase the frame rate |
| 2 | The user turns his/her head quickly | Reduce the resolution (to reduce the data transfer rate) |
| 3 | The user jumps | Reduce the vector complexity |
| 4 | The user closes his/her eyes over a long time | Stop the transmission of the virtual reality content |
| 5 | The user's heart beat exceeds a threshold | Stop the transmission of the virtual reality content |
| 6 | The user dazes | Reduce the frame shaking |
| 7 | The user is behind the beat | Reduce the play speed |
| 8 | The user's blood pressure goes up | Change to transmit the soft music |
| 9 | The user falls down | Stop the transmission of the virtual reality content |

Figure 4:
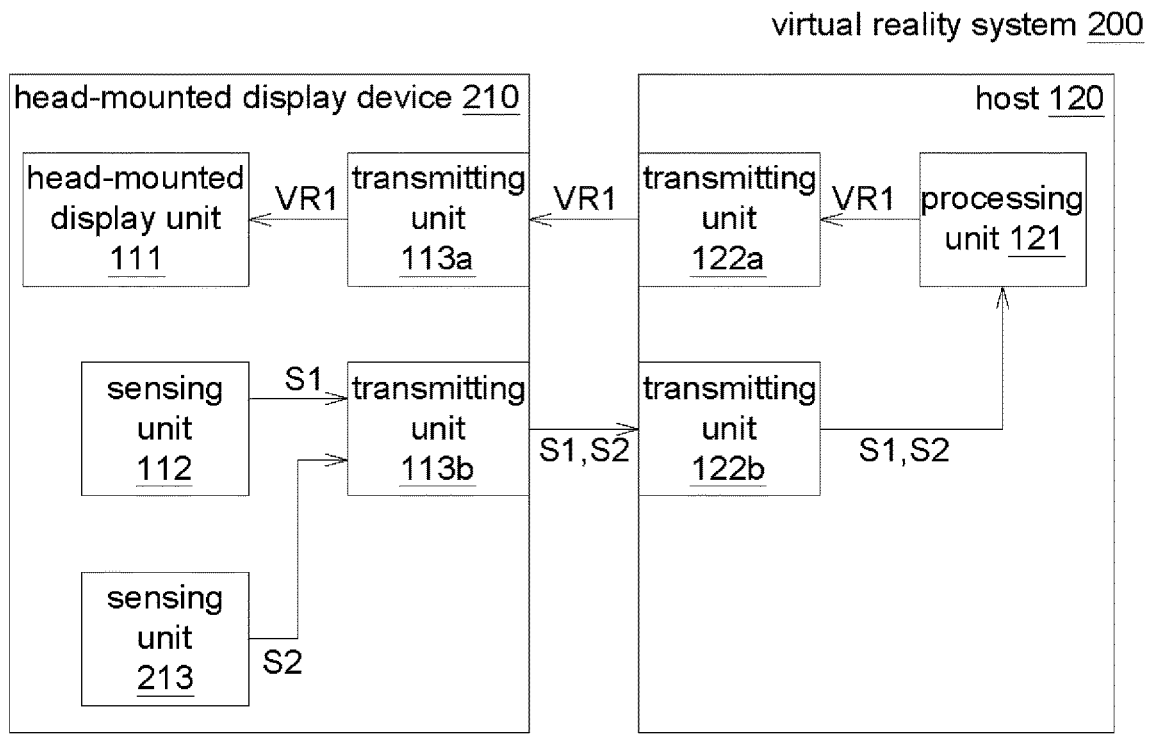
FIG. 4 is a block diagram of a virtual reality system according to another embodiment of the invention.

Referring to FIG. 4, a block diagram of a virtual reality system 200 according to another embodiment of the invention is shown. This embodiment is different from previous embodiment in that a head-mounted display device 210 includes two sensing units 112 and 213, and the similarities are not repeated here. The two sensing units 112 and 213 respectively detect two sensing signals S1 and S2. The processing unit 121 of the host 120 performs different adaptive control on the procedure of transmitting the virtual reality content VR1 to the head-mounted display device 110 with respect to the sensing signals S1 and S2.

Figure 5:
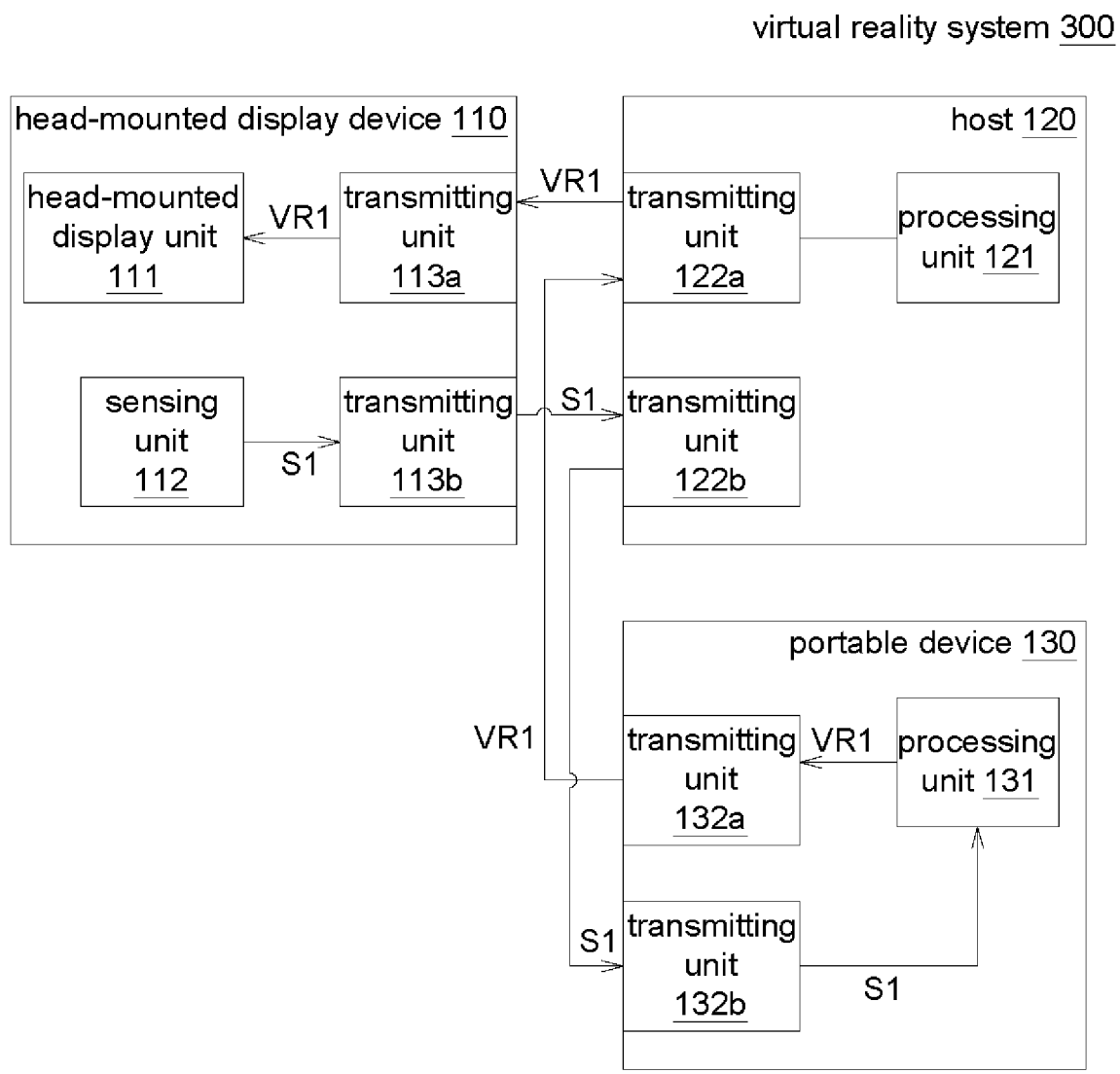
FIG. 5 is a block diagram of a virtual reality system according to another embodiment of the invention.

Referring to FIG. 5, a block diagram of a virtual reality system 300 according to another embodiment of the invention is shown. As indicated in FIG. 5, the virtual reality system 300 includes the head-mounted display device 110, the host 120 and a portable device 130.

The portable device 130 can be realized by a smart phone, a PC tablet or a notebook computer.

The portable device 130 includes a processing unit 131 and a transmitting unit 132. The transmitting unit 132 performs signal transmission. The transmitting unit 132 can be realized by a wireless transmission module or a wired transmission module. The processing unit 131 performs various image processing procedures. The processing unit 131 can be realized by a chip, a circuit board, a circuit or a storage device storing several programming codes.

In the present embodiment, the portable device 130 adaptively controls a procedure of transmitting the virtual reality content VR1 to the head-mounted display device 110 according to the sensing signal S1 of the head-mounted display device 110.

Figure 6:
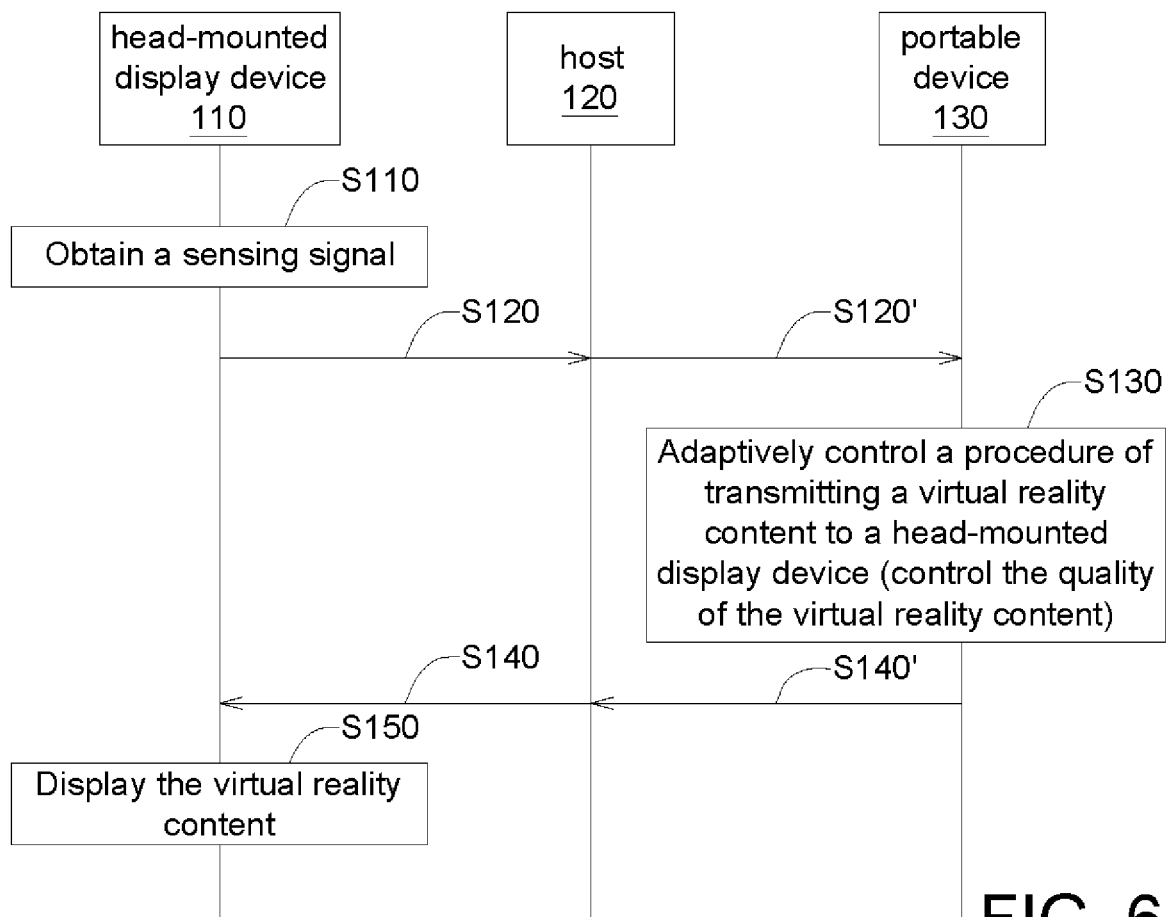
FIG. 6 is a flowchart of a controlling method of a virtual reality system according to another embodiment of the invention.

The operations of the above elements are described below with accompanying drawings. Referring to FIG. 6, a flowchart of a controlling method of the virtual reality system 300 according to another embodiment of the invention is shown.

Firstly, the method begins at step S110, the sensing signal S1 is obtained by the sensing unit 112 of the head-mounted display device 110. The sensing signal S1 can be realized by a rotating signal, a movement signal, or a vibration signal of the head-mounted display device 110. In an embodiment, the sensing signal S1 can be realized by a physiological signal of a user.

Then, the method proceeds to step S120, the sensing signal S1 is transmitted to the host 120 by the transmitting unit 113b of the head-mounted display device 110.

Then, the method proceeds to step S120', the sensing signal S1 is transmitted to the portable device 130 by the transmitting unit 122b of the host 120.

Then, the method proceeds to step S130, the procedure of transmitting the virtual reality content VR1 to the head-mounted display device 110 is adaptively controlled by the processing unit 131 of the portable device 130 according to the sensing signal S1. In the present step, the processing unit 131 controls the quality of the virtual reality content VR1 (such as a compression ratio, a resolution, a vector complexity, a frame rate, a brightness or a saturation).

Then, the method proceeds to step S140' and step S140, the procedure of transmitting the virtual reality content VR1 to the head-mounted display device 110 is performed by the portable device 130 and the host 120.

Then, the method proceeds to step S150, the virtual reality content VR1 is displayed by the head-mounted display unit 111 of the head-mounted display device 110.

Figure 7:
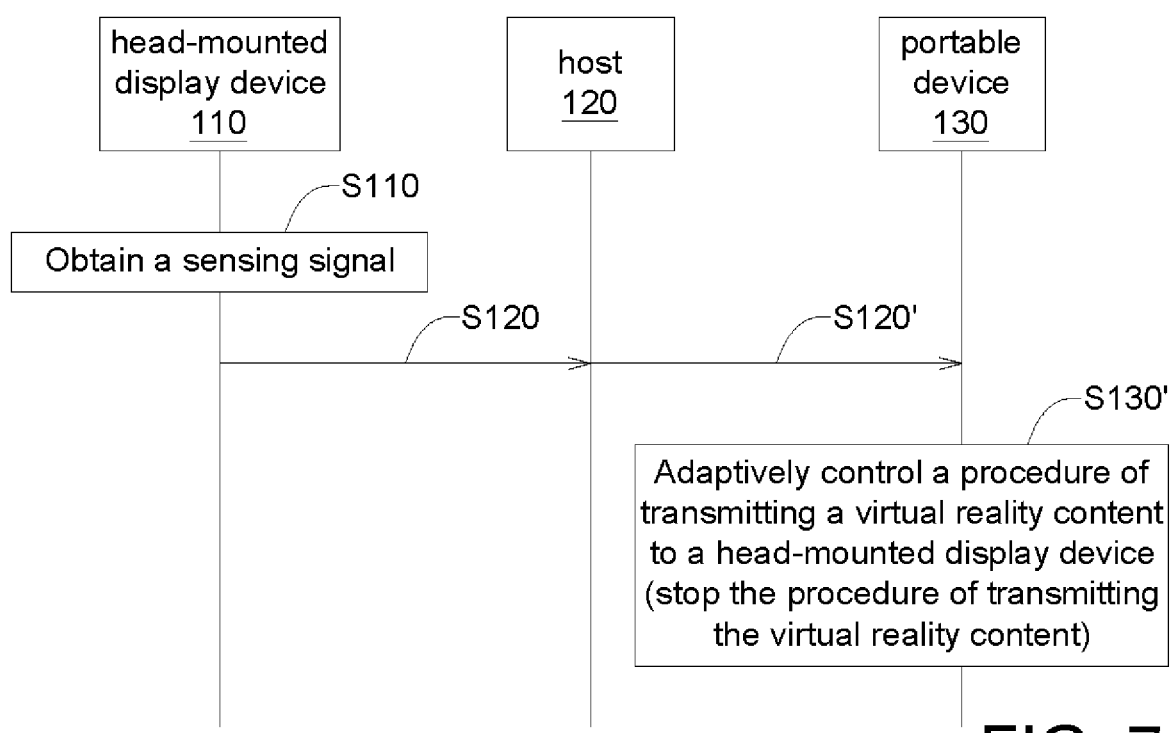
FIG. 7 is a flowchart of a controlling method of a virtual reality system according to another embodiment of the invention.

Referring to FIG. 7, a flowchart of the controlling method of the virtual reality system 300 according to another embodiment of the invention. In step S130' of another embodiment, the procedure of transmitting the virtual reality content VR1 is stopped by the processing unit 131, and subsequent steps S140 and S150 are not performed.

According to the embodiment disclosed above, the procedure of transmitting the virtual reality content can be adaptively controlled according to the sensing signal, such that latency can be effectively reduced, the immediacy requirement of operation can be achieved, and the application of virtual reality can be more user friendly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling method of a virtual reality system, comprising:
   obtaining a sensing signal by a head-mounted display device wore on a user; and
   adaptively controlling a procedure of transmitting a virtual reality content to the head-mounted display device by a host or a portable device according to the sensing signal;
   wherein in the step of adaptively controlling the procedure of transmitting the virtual reality content, a compression ratio, a frame rate or a saturation of the virtual reality content is controlled, and
   wherein when the sensing signal indicates the user is dazed, a frame shaking of the virtual reality content is reduced.

2. The controlling method of the virtual reality system according to claim 1, in the step of adaptively controlling the procedure of transmitting the virtual reality content, the procedure of transmitting of the virtual reality content is stopped.

3. The controlling method of the virtual reality system according to claim 1, wherein the sensing signal is a rotating signal, a movement signal, or a vibration signal of the head-mounted display device.

4. The controlling method of the virtual reality system according to claim 1, wherein the sensing signal is a physiological signal of the user.

5. A virtual reality system, comprising:
   a head-mounted display device for obtaining a sensing signal, wherein the head-mounted display device is wore on a user; and
   a host for adaptively controlling a procedure of transmitting a virtual reality content to the head-mounted display device according to the sensing signal;
   wherein the host controls a compression ratio, a frame rate or a saturation of the virtual reality content according to the sensing signal, and
   wherein when the sensing signal indicates the user is dazed, a frame shaking of the virtual reality content is reduced.

6. The virtual reality system according to claim 5, wherein the host stops the procedure of transmitting of the virtual reality content according to the sensing signal.

7. The virtual reality system according to claim 5, wherein the sensing signal is a rotating signal, a movement signal, or a vibration signal of the head-mounted display device.

8. The virtual reality system according to claim 5, wherein the sensing signal is a physiological signal of the user.

9. A head-mounted display device, wore on a user and comprising:
   a sensing unit for obtaining a sensing signal; and
   a transmitting unit for transmitting the sensing signal to a host, such that the host adaptively controls a procedure of transmitting a virtual reality content to the head-mounted display device according to the sensing signal;
   wherein the host controls a compression ratio, a frame rate or a saturation of the virtual reality content according to the sensing signal, and
   wherein when the sensing signal indicates the user is dazed, a frame shaking of the virtual reality content is reduced.

10. The head-mounted display device according to claim 9, wherein the sensing signal is a rotating signal, a movement signal, or a vibration signal of the head-mounted display device.

* * * * *